May 11, 1965 O. B. BERLINGS 3,182,548
PICTURE SLIDE PROJECTOR WITH COOLING
Filed Sept. 13, 1961 3 Sheets-Sheet 1

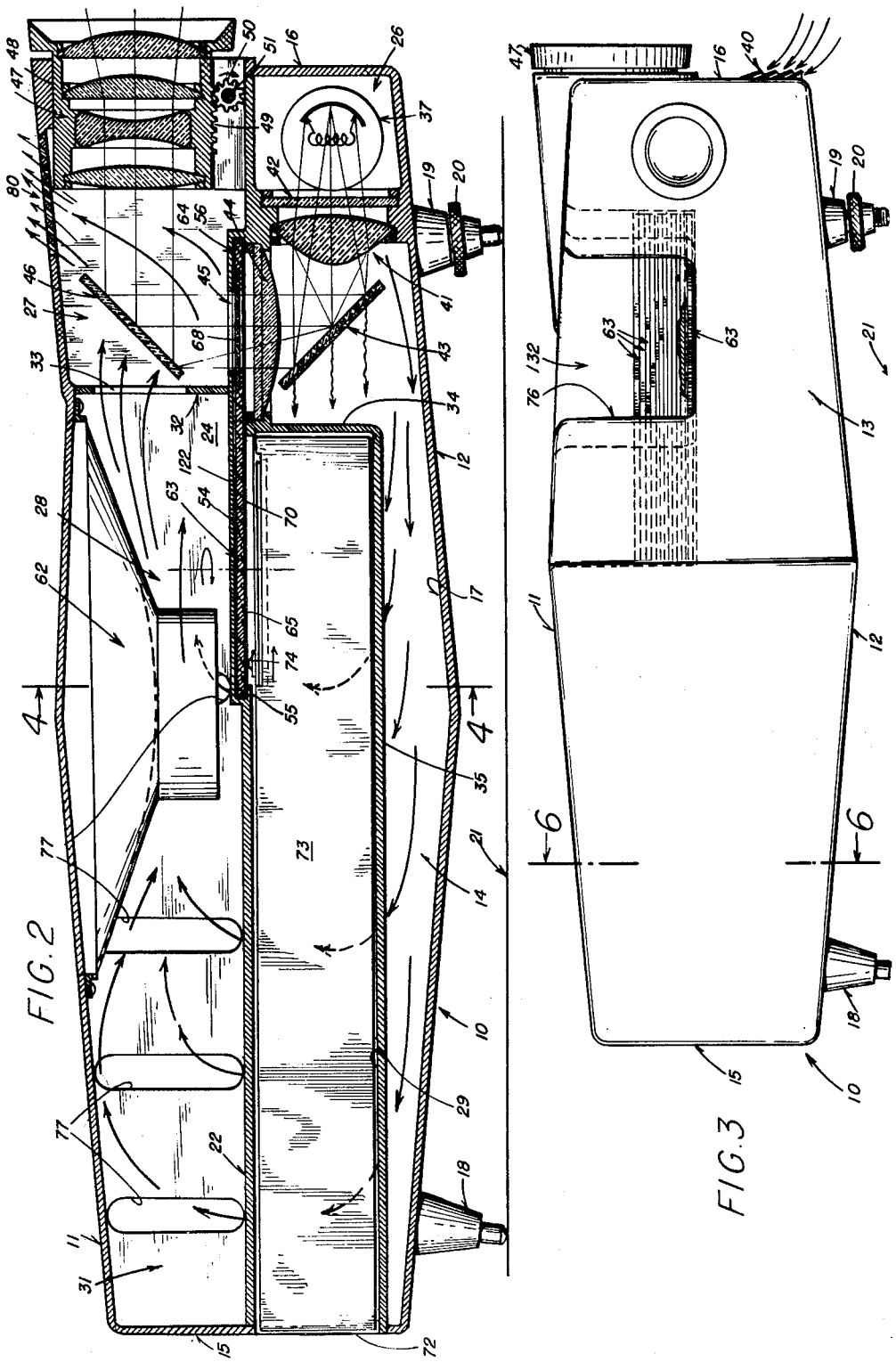

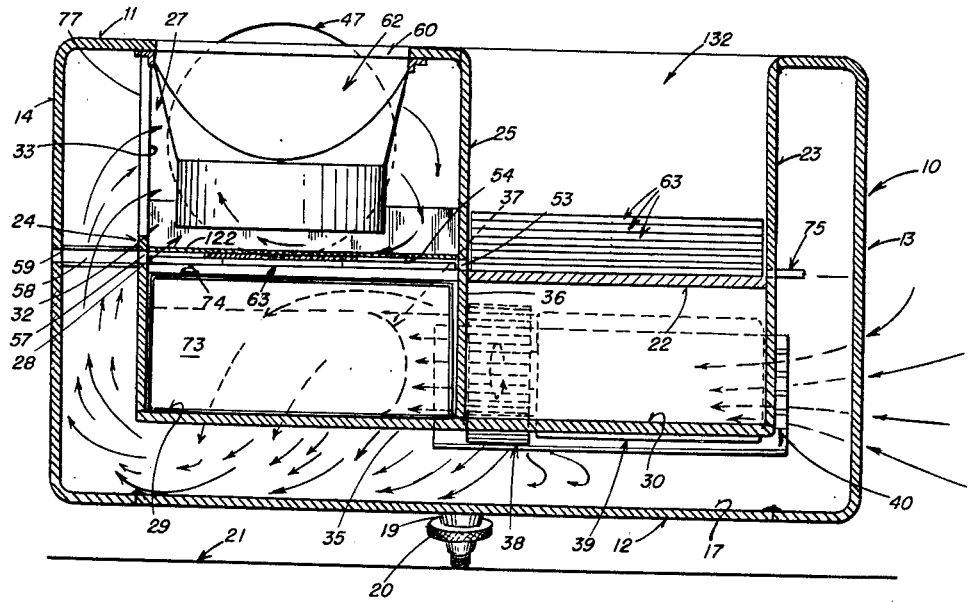
FIG. 4
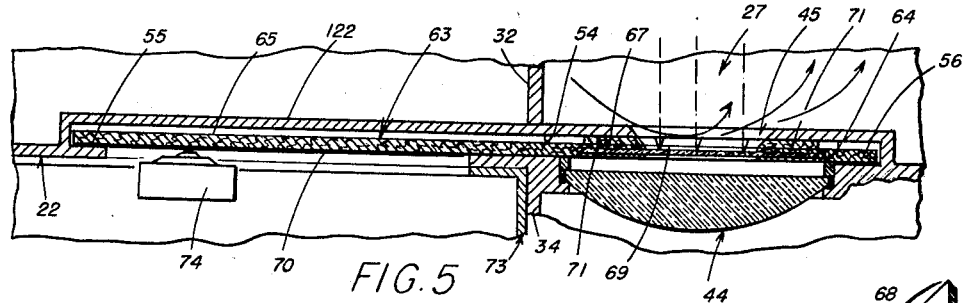
FIG. 5
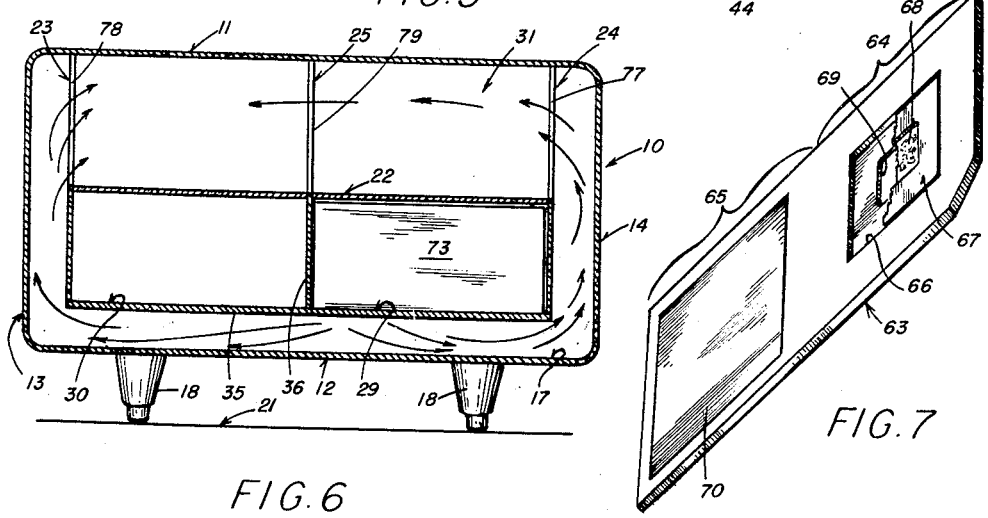
FIG. 6
FIG. 7 ial, such as aluminum and its alloys, in sheet or cast plate form.

United States Patent Office 3,182,548
Patented May 11, 1965

3,182,548
PICTURE SLIDE PROJECTOR WITH COOLING
Orests B. Berlings, Brooklyn, N.Y., assignor, by mesne assignments, to Sono-Slide Corporation, New York, N.Y., a corporation of New York
Filed Sept. 13, 1961, Ser. No. 137,842
8 Claims. (Cl. 88—24)

The present invention relates to picture slide projectors for projecting a still picture upon a suitable screen from a slide image transparency.

A general object of the present invention is to provide such a picture slide projector which is equipped with unique means preventing heat "popping" or warping of the slide transparencies during projection that causes their projected images to become out of focus, and thus avoiding the necessity of additional focusing adjustments of the objective otherwise required when each slide pops.

A more specific object of the invention is to make provision in such a projector for maintaining elevated air pressure against a slide image transparency while it is in the projecting optical system, which biases it in a direction opposite to that it has a tendency to bulge under warping heat, thus effectively resisting or offsetting such tendency.

Another object of the invention is to provide embodiments of the present projector with casing structure of a nature efficiently to transfer lamp heat from internal blower driven air to the external atmosphere before discharge to the latter.

A further object of the invention is to provide for effective dissipative transfer of lamp heat from cooling air circulated within the projector casing and then efficiently employ the cooled air before discharge to atmosphere to pressure bias a slide image transparency sufficiently to minimize heat warpage thereof.

Other objects of the invention will in part be obvious and will in part appear hereinafter.

A still further object of the present invention is to provide a structural embodiment of the apparatus which may be readily constructed and permits economic mass production and assembly while assuring efficient use and operation thereof.

Embodiments of the present invention which effectively attain these and other objects feature a casing with the walls thereof defining a chamber subdivided into compartments. One of the compartments is a beam emission or optical outlet space, preferably equipped with the projection objective. This beam emission compartment has an inlet optical window against which a slide image transparency is held when in its projecting position, thereby substantially closing the window. Means are provided for supplying air under elevated pressure to this compartment so as to bias the slide image transparency outward for neutralizing or offsetting tendency thereof to bulge inwardly under elevated temperatures, i.e., heat "popping." By avoiding the heat popping or inward bulging of the slide image transparency, which always takes place to the emulsion side thereof, the necessity for altering the focusing, i.e., adjusting the position of the objective, is eliminated.

In preferred embodiments, the air pressure biasing of each slide image transparency when in the projecting position is attained in an economical manner by using cooling air which is employed to carry off lamp heat. In doing so the heat which is picked up by the air circulated within the casing from the lamp is then transferred through casing wall structure to the atmosphere before this air is fed to the beam emission compartment there to pressure bias each slide image transparency. For this purpose, preferably the external walls of the casing are made of relatively high heat conducting material, such as aluminum and its alloys, in sheet or cast plate form.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 2 is a medial longitudinal section taken substantially on line 2—2 of FIG. 1;

FIG. 3 is a side elevational view of the picture slide projector illustrated in FIGS. 1 and 2, to a smaller scale, with a portion of a stack of record plate members stored in a supply magazine well thereof being broken away;

FIG. 4 is a transverse sectional view taken substantially on line 4—4 of FIG. 2, with parts broken away;

FIG. 5 is a longitudinal section, with parts broken away, to enlarged scale showing structural details at the projecting position of the record plate member;

FIG. 6 is a transverse sectional view taken substantially on line 6—6 of FIG. 3; and FIG. 7 is a perspective view, with parts broken away, of a record plate member suitable for employment with the illustrated embodiment of the picture slide projector.

Figure 1:
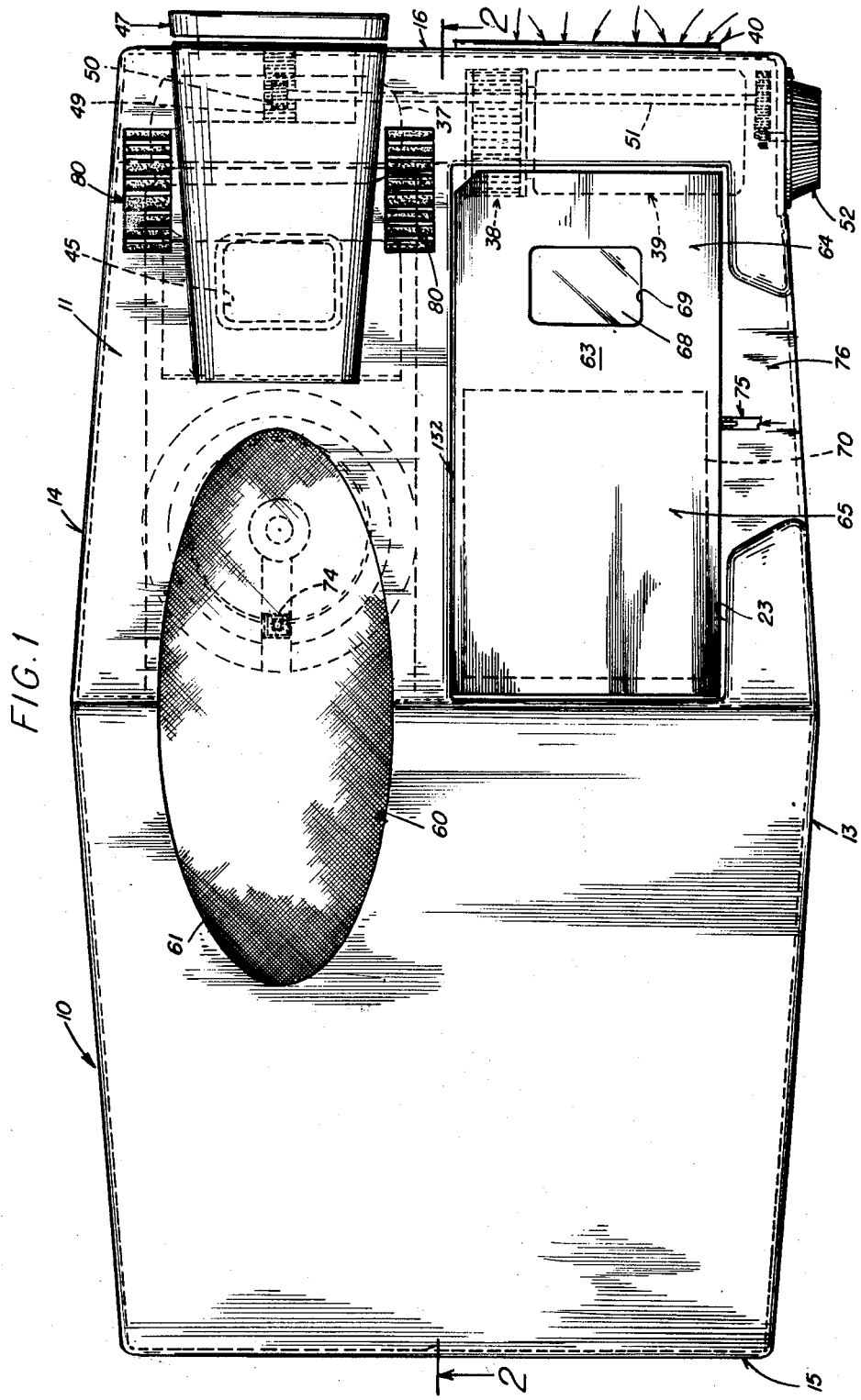
FIG. 1 is a top plan view of an embodiment of the picture slide projector of the present invention, with parts broken away.

Referring to the drawings, in which like numerals identify similar parts throughout, it will be seen that the embodiment of the picture slide projector which is illustrated at 10, by way of example, comprises a casing, preferably generally rectangular in shape, defined by a top wall 11, a bottom wall 12, transversely spaced opposed right and left side walls 13 and 14, a closing back wall 15 and a front wall 16, circumscribing a housing chamber 17. At least the casing top, bottom and side walls 11, 12, 13 and 14 are formed of relatively high heat conductive material, such as cast or sheet aluminum stock, and may be made in sections suitably secured together by removable fasteners or permanent anchorages, and the like. If desired, all of the walls of the casing 10 may be formed of such relatively high heat conductive material, as may be partitioning wall structures subdividing the housing chamber 17. Consequently, the entire casing construction and the partitioning wall structures therein may together form a heat conductive mass for even distribution of lamp house heat and for transfer of the heat readily to the surrounding atmosphere.

The bottom wall 12 suitably carries a pair of rear supporting legs or feet 18, and a front jack leg or foot 19 having an elevating screw 20 for adjusting the location of the projected image on the face of a projection screen. The high heat conductive bottom wall 12 is thus suitably supported appreciably, such as about one-half inch, above a horizontal supporting surface, such as a table top 21, to prevent heat damage thereto.

The partitioning means within the main chamber 17 includes a subdividing horizontal wall structure 22 which, as will be understood from FIGS. 4 and 6, has its side edges terminated short of the inner surfaces of the side walls 13 and 14, being suspended from the top wall 11 by suitable vertical partitioning means 23 and 24, supplemented by a medial vertical partitioning wall structure 25 which is also suspended from the top wall. Additional partitioning means includes wall structures which define with the horizontal wall structure 22 and the suspending wall structures 23, 24 and 25, a lower front lamp house space 26, an upper front optical projecting beam emission compartment space 27 on the left side, a left side medial top speaker housing space 28, an elongated sound reproducing mechanism receptive space 29 below the latter, a second elongated recess 30 on the right side which is receptive of additional operating mechanism, a rear left side space 31 in which controls may be housed, and a front record magazine well 132 on the right side. For example, above the forward section of the horizontal partitioning wall structure 22, in the space between the medial suspension wall structure 25 and the left side suspension wall structure 24 a transverse vertical partition 32 may define the back end of the beam emission compartment 27, with the latter communicated to the speaker compartment 28 to the rear thereof through an opening 33 in this partition. Also, by way of example, a vertical transverse partition wall structure 34 may be suspended from the horizontal wall structure 22 to define with another lower horizontal wall structure 35, a subdividing vertical wall structure 36 and lower sections of right and left side partitions 23 and 24 the elongated unit-receptive recesses 29 and 30.

Forward of the vertical suspending wall structure 34 the lamp house space 26 has supported suitably in its left side a suitable projection lamp 37, which may have a wattage of 150 w. and be designed to operate at 21.5 v. operable in a horizontal position and now available on the market. To the right side of the projection lamp 37 is mounted within the lower front section of the casing chamber 17 a suitable blower 38 and an electric motor 39 for rotating the blower to cause the latter to force currents of cooling air against and over the projection lamp. The blower 38 draws atmospheric air for this purpose through a grilled opening 40 in the right side of the front wall 16, as will be understood from FIGS. 1, 3 and 4.

As will be seen from FIG. 2, the optical system includes, in addition to the projection lamp 37 and behind it a condenser lens 41, which may be of conventional construction, protected, if desired, by an intervening transparent shield 42. An oblique mirror 43, in front of the depending wall 34, may receive the light beam from the condenser 41 and turn it 90° upward to pass through a laterally-extending field lens 44 suitably mounted below an optical window 45 in horizontal wall structure 22. A second oblique mirror 46 may be mounted above the optical window 45 within the beam emission compartment 27, again to turn the projecting beam 90° now forward to pass through an objective lens assembly 47 which is mounted in a hole in front wall 16 in a substantially fluid-tight manner. Preferably, the objective 47 includes a housing sleeve 48 carrying a rack 49 meshed with a pinion 50 fixed on a cross shaft 51 which, as will be seen from FIG. 1, may carry on the right side a focusing knob 52. Thus the forward section of the horizontal wall structure 22 and the suspending vertical partitions 24 and 25, together with the transverse partition 32, segregate the area or space 27 about the objective 47 from other space of chamber 17 in the casing 10, to define a separate optical projecting beam emission compartment in the form of an objective compartment.

Adjacent the top surface of the portion of the horizontal wall structure 22 which forms the bottom of the open top magazine well 132 medial vertical partition 25 is provided with an elongated horizontal slot 53, seen in FIG. 4. This slot 53 is aligned with a record plate member or card receiving recess 54 defined on the top by an offset panel 122, which forms a part of and may be made integral with the horizontal wall structure 22. Record receiving recess 54 has supporting ledges 55 and 56 at the front and back edges thereof, as may be better understood from FIG. 5, and serves to define the projecting position of the picture record or slide. The depending partition 24 also has an elongated horizontal slot 57 therein, aligned with the recess 54 and the inlet slot 53, for discharge of the picture record or slide from the projecting position after the image of its transparency has been projected to the screen. A pair of channel bars, one of which is indicated at 58 in FIG. 4, may be provided at opposite ends of the slot 57 to extend to discharge slot 59 in the external wall 14 for guiding the end edges of the picture record or slide therethrough.

As will be understood from FIGS. 1 and 4 the top wall 11 is provided behind the objective compartment 27 with a sound emission opening 60, which, if desired, may have stretched thereacross a perforate masking screen 61. There is gasketed to the edges of the sound emission opening 60 an imperforate speaker cover 62 in which a suitable sound reproducing speaker is housed, and which effectively closes off the sound emission opening to prevent leakage of internal air currents out therethrough. Thus, the speaker housing space or compartment 28 is segregated from direct connection with the surrounding atmosphere through the sound emission opening 60, while allowing passage of internal air currents from the rear forward to the back opening 33 in the back partition 32 of the objective compartment 27.

As will be seen from FIGS. 1, 2, 5 and 7 a record plate member 63 suitable for use with the present projector may be in the form of a rectangular cardboard frame having a front section 64 and a rear section 65. The front section 64 of the bottom side of record card 63 is provided with a shallow windowed recess 66 in which may be mounted with a friction fit a conventional picture slide 67 carrying in a cardboard frame an image transparency 68 opposite window 69. Thus, when the record card 63 is slidably received in recess 54 of the horizontal wall structure 22 its image transparency 68 is interposed between the field lens 44 and the optical window 45 in this wall structure, and in this projecting position is in alignment with the latter. The rear section 65 of the bottom side of record card 63 carries thereon sound track means, which may be in the form of a rectangular sheet 70 having a coating of magnetic material in which a spiral sound record has been defined, suitably affixed to the bottom face of the record card, such as by cement. In the projecting position of the record card 63 the emulsion side of the image transparency 68 faces upwardly to be exposed to the air in the objective compartment 27 and the fluid pressure thereof. In order to avoid undue leakage or by-passing of air from the lamp house 26 through the optical window 45 directly into the optical projecting beam emission or objective compartment 27, the bottom of offset panel 122 of the horizontal wall structure 22 may be provided marginally about the optical window with suitable gasketing means 71, which may be in the form of strips of felt, or the like. However, the amount of the field lens 44 may be such as to serve this purpose.

The elongated recess 29, which has an opening 72 at the rear in black wall 15, may slidably receive a sound reproducing structural unit or pack 73, structural details of which are not shown since this forms no part of the present invention. As is known in the art, such a sound reproducing pack includes a driven rotary sound pick-up head 74 which in operation is rotated and progressively moved radially to follow a spiral track in alignment with the spiral sound track on the sound record sheet 70.

While the open top magazine well 132 is adapted to receive therein a stack of the record cards 63, one such record card may be dropped therein at a time for projection of a picture from its image transparency 68 and reproduction of the sound carried by its record sheet 70. The bottom record card 63 of the stack, or the single one dropped into the well 132, as the case may be, is transferred from the well by suitable pusher mechanism diagrammatically indicated at 75 in FIGS. 1 and 4, no details thereof being shown since it forms no part of the present invention. Record card pusher 75 transfers the record card 63 in the bottom of the well by sliding it laterally through the slot 53 to the projecting position illustrated in FIGS. 2, 4 and 5. After a picture has been projected from the image transparency 68 of this record card 63 and sound reproduced by the encased speaker at 62 through the medium of the sound reproduction mechanism 73 in accordance with the magnetic sound track in sound record sheet 70, the record card will be discharged through elongated slots 57 and 59 by push thereon through the medium of the next following record card and its lateral translation by the pusher mechanism 75. If desired, the outer side wall structure, including suspending partition 23, may be provided with an access notch 76, as will be seen in FIGS. 1 and 3, for ready manual engagement of the record cards 63 in the magazine well 132.

In accordance with the present invention a circuitous path for air flow is provided which extends from the lamp house space 26 back along the inner face of bottom wall 12 and the inner surfaces of side walls 13 and 14, passages for this purpose being defined between these outer walls and the interior partitioning structures 23, 24 and 35. In order to permit indrawn cooling air, which is sucked in through the grilled opening 40 by the blower 38 into the lamp house area 26, to be transferred from these side and bottom passages up into the speaker compartment 28 for flow through opening 33 into the objective compartment 27, partitioning suspending wall structure 24 is provided with suitable openings, such as those indicated at 77 in FIGS. 2, 4 and 6. Similarly, the suspending partitioning wall structure 23 is provided to the rear of the magazine well 132 with similar openings 78, as is also partition 25 which is indicated at 79 in FIG. 6. Consequently, air which is caused to flow about and over the projection lamp 37 by the blower 38, to absorb heat therefrom and thus keep the lamp and the surrounding area at a moderate temperature, then is caused to flow back along the inner surfaces of the bottom wall 12 and the side walls 13 and 14, as will be understood from FIGS. 2 and 4, then to pass upwardly and across into the speaker compartment 28, as is further illustrated in FIG. 6, and finally forward into the objective compartment 27 through the opening 33. The optical projecting beam emission compartment, i.e., the objective compartment 27, is provided with means, such as grill openings 80, illustrated in FIGS. 1 and 2, which together define a limiting flow escape orifice leading to atmosphere. The area of the discharge orifice defined by the grill openings 80 is so related to the volume of air supplied by the blower 38 along the circuitous path to the objective compartment 27 as to maintain an elevated pressure of the cooling air in the objective compartment for application of fluid pressure to the upper emulsion side of the image transparency 68. Since the cooling air by the time it reaches the objective compartment 27 has appreciably dissipated lamp heat through the conductive outer walls to atmosphere, it will assure that the image transparency 68 of each record card 63 in the projecting position will be kept at a moderate temperature. Also, the pressure biasing of the emulsion side of the image transparency 68 outwardly of the objective compartment, i.e., downward, cooperatively supplements the maintenance of the image transparency at a moderate temperature to prevent undue inward, i.e., upward, heat bulging or out-of-focus popping. Accordingly, the avoidance of popping of the image transparencies involves two factors, (1) the biasing thereof with elevated fluid pressure and (2) the flow thereover of cooling air, the temperature of which has been adjusted after flowing over the projection lamp by dissipation of heat therefrom through casing walls to atmosphere before being used to apply the fluid pressure biasing, and this adjusting temperature will be within safe operating limits. In accordance with the present invention the elevated pressure employed for the fluid pressure biasing within the objective compartment 27 may be of the order of a fraction of one pound gauge. The fluid pressure biasing may in operation of practical embodiments of the present invention be provided, if desired, by an air pressure in the objective compartment in the range of about 1 to 5 p.s.i.g.

There is no undue leakage of pressurized air through horizontal slots 53, 57 and 59 to atmosphere to prevent attainment of the fluid pressure biasing of the image transparency in the projecting position. The edges of the record card 63 effectively block to an appreciable degree the slots 53 and 57. As to the slot 59 it is a simple matter to accommodate the amount of leakage therethrough directly to atmosphere by the volume and the rate of flow forced by the blower along the circuitous path through the internal passages. Further, it is a simple matter to equip the side slot 59 with a spring-biased closing flap which will minimize leakage of air therethrough while permitting it to be swung back by the advancing side edge of the record card when the latter is discharged from the projecting position.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A picture slide projector for projecting a still image comprising, in combination, a casing defined by walls of relatively high heat conductive material circumscribing a housing chamber, partition means subdividing the chamber into a plurality of compartments including a lamp house associated with a blower directing in-drawn cooling currents of atmospheric air against a projection lamp therein and a separate optical projecting beam emission compartment defined and blocked off from said lamp house by air passage-preventing slide-supporting partition structure having a beam-passing optical window against which a slide bearing an image transparency for projection is to be held temporarily with substantial closure of the window and with the emulsion side of the image transparency facing inward in respect to said beam emission compartment for contact only by air in the latter with the image transparency protected from the lamp house air pressure, means defining air flow passages extending from said lamp house along a circuitous path adjacent inner surfaces of some of said casing walls to said beam emission compartment permitting transfer of heat to said walls from cooling air forced by the blower out of said lamp house to said beam emission compartment as it flows along said walls for dissipation from the latter of transferred heat to the surrounding atmosphere, and means defining a limiting flow escape orifice leading from said beam emission compartment to atmosphere to maintain an elevated pressure of the cooling air in said beam emission compartment applied to the emulsion side of the image transparency to prevent undue inward heat bulging or out of focus "popping."

2. The picture slide projector as defined in claim 1 characterized by said beam emission compartment being in the form of an objective compartment housing an objective in its front wall.

3. The picture slide projector as defined in claim 1 characterized by said casing walls including a bottom wall and opposed side walls, said air flow passage-defining means directing flow of blower-forced cooling air over inner surfaces of said bottom and side walls.

4. The picture slide projector as defined in claim 3 characterized by feet mounted to the underside of said bottom wall to support it in an appreciably elevated position above a supporting surface to avoid heat damage to the latter.

5. The picture slide projector as defined in claim 1 characterized by said partition means being formed of relatively high heat conductive material in heat conduction contact with said casing walls, for transfer to and dissipation from the latter to the surrounding atmosphere of heat in the air flowed thereagainst when blower-forced from said lamp house along the air flow passages to said beam emission compartment.

6. The picture slide projector as defined in claim 1 characterized by said slide-supporting partition structure being equipped adjacent its optical window with carrier means temporarily to receive in a removable manner a slide frame about the image transparency, and gasketing means associated with said carrier means for contact by the slide frame to prevent undue by-pass of cooling air through the window.

7. A picture slide projector for projecting a still image from a slide transparency carried by a record plate member comprising, in combination; a casing defined by walls including top, bottom and side walls of relatively high heat conductive material, a closing back wall and a front wall through which an objective projects in a substantially fluid-tight manner; partition means within said casing including horizontal and upwardly extending wall structures segregating the area about said objective from other space in said casing to define the segregated area as an objective compartment; a projection lamp and associated optical elements in said casing outside of said objective compartment to constitute with said objective an optical projecting system, said horizontal wall structure having a beam-passing optical window therein through which the optical axis of said system extends; a blower in said casing outside of said objective compartment for directing cooling currents of indrawn atmospheric air upon said lamp; means in said casing defining air flow passages along a circuitous path adjacent inner surfaces of casing walls and extending from said lamp into said objective compartment; means defining a horizontal way adjacent said horizontal wall structure for slidably receiving one such record plate member in a horizontal position and holding its slide transparency temporarily against the window with substantial closure thereof; and means defining a limiting flow escape orifice leading to atmosphere from said objective compartment to maintain in the latter an elevated pressure of cooling air applied to the slide image transparency at the window.

8. The picture slide projector as defined in claim 7 characterized by said means in said casing which defines with certain portions of the casing walls the circuitous air flow passages between said lamp house and the objective compartment including compartment wall means defining a compartment housing sound reproducing equipment in said casing for simultaneously with projection of the image of the slide transparency reproducing sound from a sound track carried on the record plate member, said sound track being in reproduction association with said equipment when the slide transparency is at the optical window with said equipment housed in said compartment being isolated by said compartment-defining wall means from the air force-flowed from said lamp house to said objective compartment.

References Cited by the Examiner
UNITED STATES PATENTS

| 2,691,320 | 10/54 | Borberg | 88—18 |
| 2,817,267 | 12/57 | Halahan | 88—24 |
| 2,837,965 | 6/58 | Goldsmith | 88—24 |
| 2,953,966 | 9/60 | Leitz et al. | 88—24 X |
| 3,002,426 | 10/61 | McCabe | 88—28 |
| 3,041,933 | 7/62 | Emmel | 88—24 X |
| 3,117,489 | 1/64 | Wilton | 88—24 |

FOREIGN PATENTS 884,311  4/43  France.

NORTON ANSHER, *Primary Examiner.*

EMIL G. ANDERSON, WILLIAM MISIEK, *Examiners.*